United States Patent
Suzuki et al.

(10) Patent No.: US 9,609,268 B1
(45) Date of Patent: Mar. 28, 2017

(54) ELECTRONIC APPARATUS

(71) Applicants: KABUSHIKI KAISHA TOSHIBA, Minato-ku, Tokyo (JP); TOSHIBA LIFESTYLE PRODUCTS & SERVICES CORPORATION, Ome, Tokyo (JP)

(72) Inventors: Nobuaki Suzuki, Tokyo (JP); Takashi Doi, Tokyo (JP)

(73) Assignees: Kabushiki Kaisha Toshiba, Tokyo (JP); Toshiba Visual Solutions Corporation, Aomori (JP)

( * ) Notice: Subject to any disclaimer, the term of this patent is extended or adjusted under 35 U.S.C. 154(b) by 0 days.

(21) Appl. No.: 15/178,256

(22) Filed: Jun. 9, 2016

(30) Foreign Application Priority Data

Oct. 19, 2015 (JP) .................................. 2015-205653

(51) Int. Cl.
*H04N 7/08* (2006.01)
*H04N 7/01* (2006.01)
*H04N 7/083* (2006.01)

(52) U.S. Cl.
CPC ........... *H04N 7/083* (2013.01); *H04N 7/0125* (2013.01)

(58) Field of Classification Search
CPC ...... H04N 7/083; H04N 7/0125; H04N 7/084; H04N 7/087; H04N 7/08; H04N 5/38; H04N 5/44
USPC ........ 348/473, 474, 476–479, 441, 723, 725
IPC .............................. H04N 7/01,7/08, 5/38, 5/44
See application file for complete search history.

(56) References Cited

U.S. PATENT DOCUMENTS

2010/0026790 A1* 2/2010 Ohba ..................... G09G 5/006
348/473
2015/0319416 A1* 11/2015 Nakajima ........ H04N 21/43635
348/474

FOREIGN PATENT DOCUMENTS

JP      2005-514873 A     5/2005
WO   WO 03/058946 A2   7/2003

* cited by examiner

*Primary Examiner* — Sherrie Hsia
(74) *Attorney, Agent, or Firm* — Rutan & Tucker, LLP

(57) ABSTRACT

One embodiment relates to an electronic apparatus including a video processor and a video interface controller. The video processor transmits first uncompressed video data and high dynamic range (HDR) information in a first transmission format. The HDR information is associated with each video frame of the first uncompressed video data. The first transmission format includes a first non-blanking region in each video frame. The video interface controller receives the first uncompressed video data and the HDR information from the video processor in the first transmission format. The video interface controller transmits second uncompressed video data and the HDR information to an external device in a second transmission format. The second uncompressed video data corresponds to the first uncompressed video data. The second transmission format includes a second non-blanking region in each video frame, and the first non-blanking region is larger than the second non-blanking region.

18 Claims, 8 Drawing Sheets

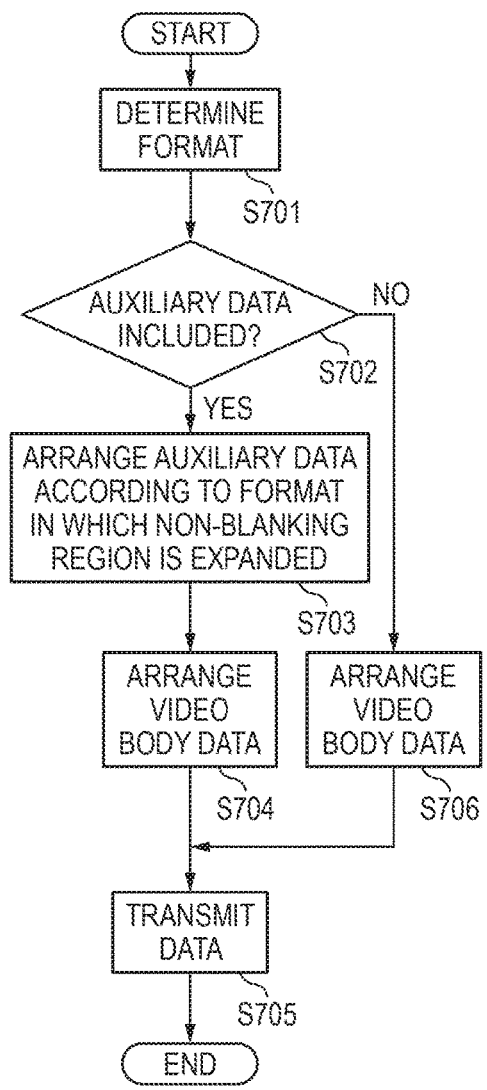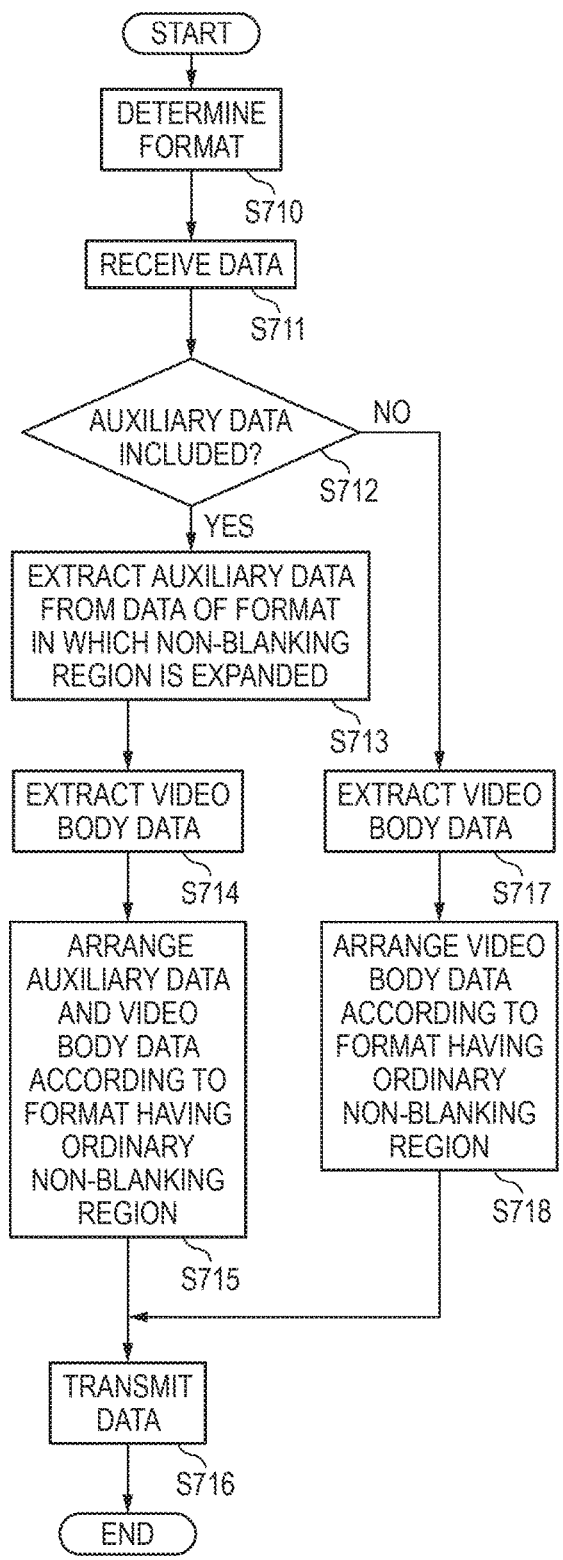

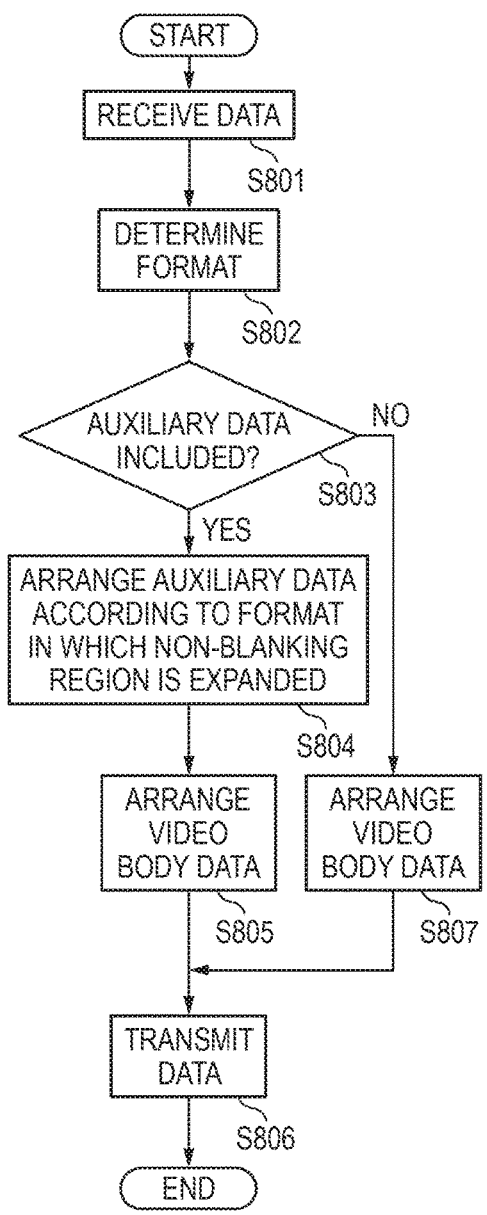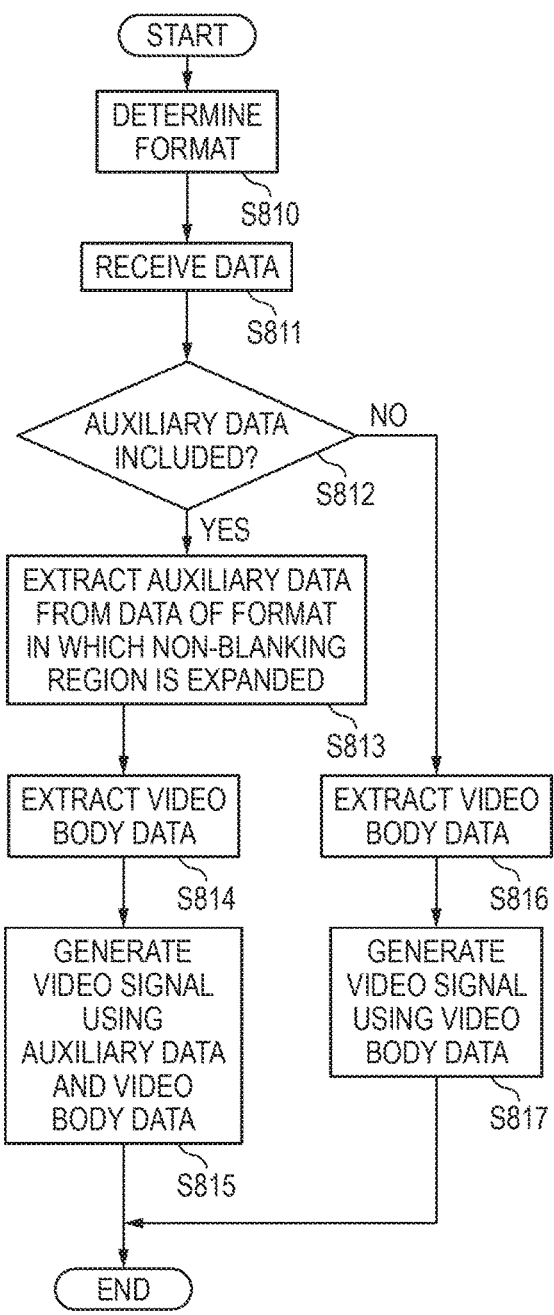
FIG. 8A
FIG. 8B

ELECTRONIC APPARATUS

CROSS-REFERENCE TO RELATED APPLICATION(S)

This application claims priority from Japanese Patent Application No. 2015-205653 filed on Oct. 19, 2015, the entire contents of which are incorporated herein by reference.

FIELD

Embodiments described herein relate an electronic apparatus that enables efficient transmission of data.

BACKGROUND

Among standards of multimedia interfaces between a video transmission device and a video receiving device is the HDMI (high-definition multimedia interface; registered trademark). Video transmission devices having an HDMI output terminal are called source devices and video receiving devices having an HDMI input terminal are called sink devices. Source devices are equipped with an HDMI LSI which functions as an HDMI transmission unit and a video processing LSI which outputs decoded video data to the HDMI LSI. Sink devices are equipped with an HDMI reception LSI and a video processing LSI for processing video data that is output from the HDMI reception LSI and thereby generating a video signal to be supplied to a display device. Inside source devices and sink devices, the HDMI LSI and the video processing LSI are connected to each other by a prescribed interface and video data is exchanged through the interface.

When information that is different from conventional video data comes to be transmitted through the interface between an HDMI LSI and a video processing LSI, it will be desired to transmit such information efficiently.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIGS. 7A and 7B are flowcharts of processes that are executed by the reproduction device according to the embodiment.

FIGS. 8A and 8B are flowcharts of processes that are executed by the display device according to the embodiment.

DETAILED DESCRIPTION

One embodiment relates to an electronic apparatus including a video processor and a video interface controller. The video processor transmits first uncompressed video data and high dynamic range (HDR) information in a first transmission format. The HDR information is associated with each video frame of the first uncompressed video data. The first transmission format includes a first non-blanking region in each video frame. The video interface controller receives the first uncompressed video data and the HDR information from the video processor in the first transmission format. The video interface controller transmits second uncompressed video data and the HDR information to an external device in a second transmission format. The second uncompressed video data corresponds to the first uncompressed video data. The second transmission format includes a second non-blanking region in each video frame, and the first non-blanking region is larger than the second non-blanking region.

An embodiment will be described with reference to the drawings.

Figure 1:
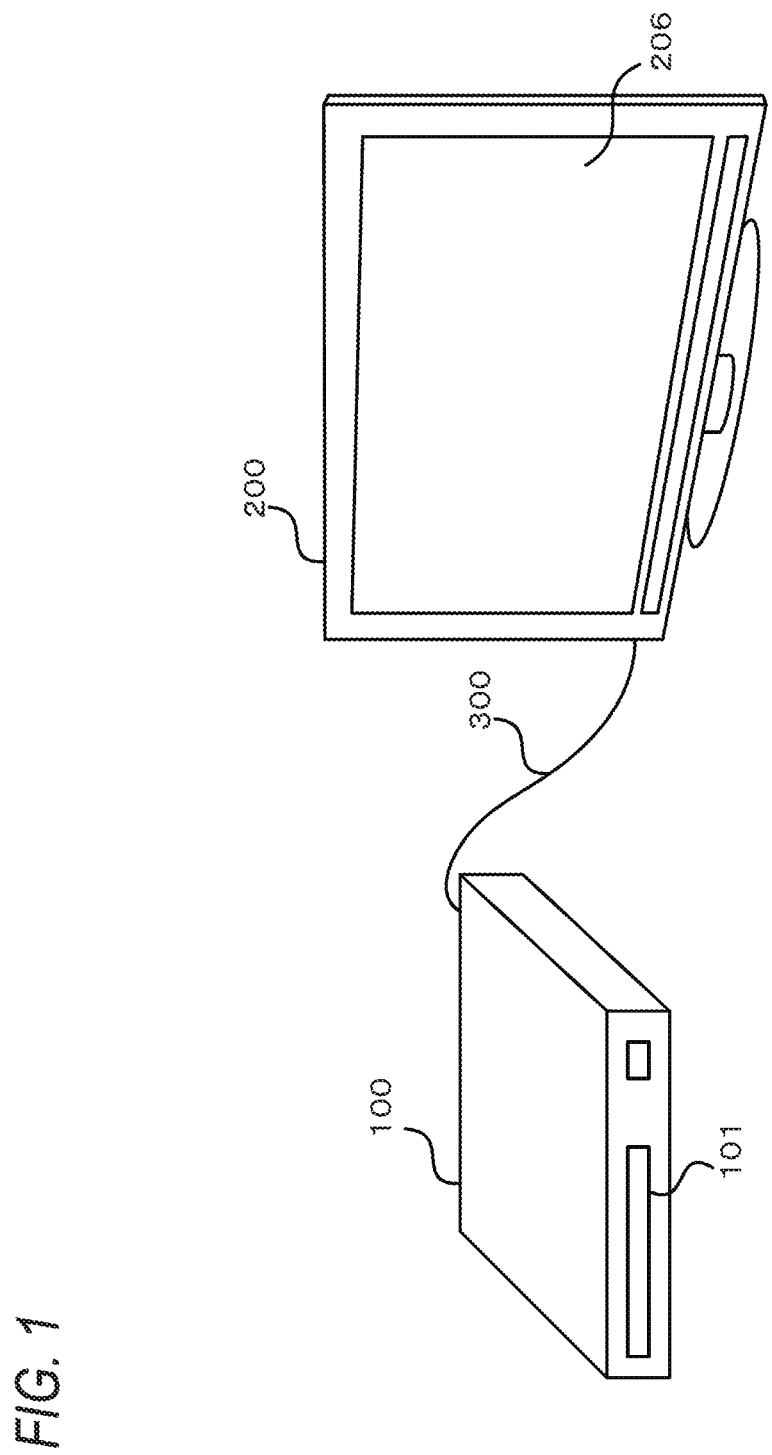
FIG. 1 shows the whole of an example data transmission system according to an embodiment, that is, an example manner of use of a reproduction device (transmission device) and a display device (receiving device) according to the embodiment.

FIG. 1 shows the whole of an example data transmission system according to the embodiment. In this data transmission system, a reproduction device 100 which is a source device and a display device 200 which is a sink device are connected to each other by an HDMI cable 300.

Equipped with a disc drive 101, the reproduction device 100 decodes coded video data stored in an optical disc or the like and transmits the decoded video data to the display device 200 over the HDMI cable 300. Equipped with a display unit 203, the display device 200 displays video using the received video data.

Figure 2:
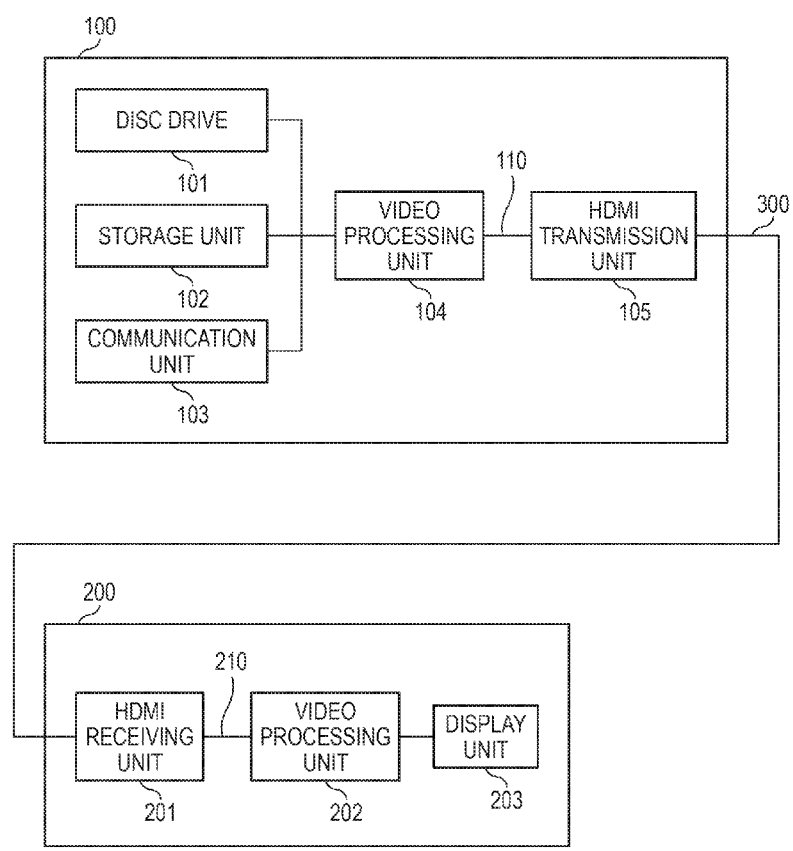
FIG. 2 shows example configurations of the reproduction device and the display device.

FIG. 2 shows example configurations of the reproduction device 100 and the display device 200. The reproduction device 100 is equipped with the disc drive 101, a storage unit 102, a communication unit 103, a video processing unit 104, and an HDMI transmission unit 105 which are implemented as hardware circuits. In FIG. 2, each of the lines connecting the individual units indicate an electric wire such as dedicated lines on a board, a standardized general-purpose communication bus, or the like. The functions of part of those units, such as the video processing unit 104, may actually be implemented by software. However, even in such a case, it may be considered that such functions are each implemented as a hardware circuit including a program storage memory and a CPU.

The disc drive 101 reads out coded video data stored in an optical disc and outputs the read-out coded video data to the video processing unit 104. The storage unit 102, which is a storage module such as an HDD or an SSD, stores coded video data recorded by the reproduction device 100 and coded video data received over a network. The storage unit 102 outputs stored coded video data to the video processing unit 104. The communication unit 103, which is a transmitting/receiving unit for wireless LAN, wired LAN, mobile communication, etc., acquires, by a communication, coded video data, examples of which are public coded video data on a public Internet site and coded video data that is provided by a server of a VoD service. That is, the communication unit 103 acquires coded video data that is stored in an external apparatus. The communication unit 103 outputs acquired coded video data to the video processing unit 104.

The video processing unit 104 generates uncompressed video data by decoding received coded video data (compressed video data). The video processing unit 104 may be a hardware decoder that is implemented as an LSI. Alternatively, where the reproduction device 100 is equipped with a CPU, the video processing unit 104 may be implemented in such a manner that the CPU reads a decoding program from a memory and runs it.

Video data that is generated by the video processing unit 104 may be in any of various formats as exemplified below. Example color space formats are RGB (RGB 4:4:4), YCbCr 4:4:4, YCbCr 4:2:2, YCrCb 4:2:0. If YCbCr 4:1:1 is established in the HDMI standard in the future, it may be used in the video processing unit 104. The RGB format include formats in which the data amount of each R, G, or B element is 8 bits, 10 bits, 12 bits, or 16 bits. The YCbCr 4:4:4, YCbCr 4:2:2, and YCrCb 4:2:0 formats each include formats in which the data amount of each Y, Cb, or Cr element is 8 bits, 10 bits, 12 bits, or 16 bits.

Example resolution formats are 640×480, 1,280×720, 1,980×1,080, 3,840×2,160, 4,090×2,160, and 7,680×4,320. Example frame rate formats are 30 Hz, 50 Hz, and 60 Hz. The video processing unit 104 outputs generated video data to the HDMI transmission unit 105 via a transmission interface 110 in one of formats that will be described later with reference to FIGS. 3-6.

Where received coded video data includes auxiliary data such as HDR (high dynamic range) information of each video frame, the video processing unit 104 outputs it to the HDMI transmission unit 105 in one of the formats that will be described later with reference to FIGS. 4A-6. The term "HDR information" as used herein means dynamic HDR information, not what is called static HDR information. That is, each frame is associated with HDR information that conforms to the video content of the frame.

The HDMI transmission unit 105, which is such an LSI circuit, for example, converts video body data and auxiliary data that are input from the video processing unit 104 via the transmission interface 110 into a video signal of a prescribed transmission format and transmits the latter to the display device 200 over the HDMI cable 300. The HDMI transmission unit 105 is equipped with a TMDS encoder for TMDS-encoding received video data, a microcomputer for communicating with an HDMI receiving unit 201, etc. The TMDS encoder outputs encoded data to respective lines of channel 0 (CH0), channel 1 (CH1), and channel 2 (CH2) of the HDMI interface.

The display device 200 is equipped with the HDMI receiving unit 201, a video processing unit 202, and a display unit 203. The HDMI receiving unit 201, which is an LSI, receives a video signal from the reproduction device 100. The HDMI receiving unit 201 converts the received video signal into video data of one of the formats that will be described later with reference to FIGS. 3-6, and transmits the latter to the video processing unit 202 via a transmission interface 210. The HDMI receiving unit 201 is equipped with a TMDS decoder for TMDS-decoding received video data received from the respective lines of channel 0 (CH0), channel 1 (CH1), and channel 2 (CH2), a microcomputer for communicating with the HDMI transmission unit 105, etc.

The video processing unit 202 converts video data that is input from the HDMI receiving unit 201 into a video signal that is in such a format as to be displayable by the display unit 203, and outputs the latter to the display unit 203. The display unit 203 displays video using the received video signal.

FIGS. 3-6 show example formats that are used for transmission from the video processing unit 104 to the HDMI transmission unit 105 and transmission from the HDMI receiving unit 201 to the video processing unit 202.

Figure 3:
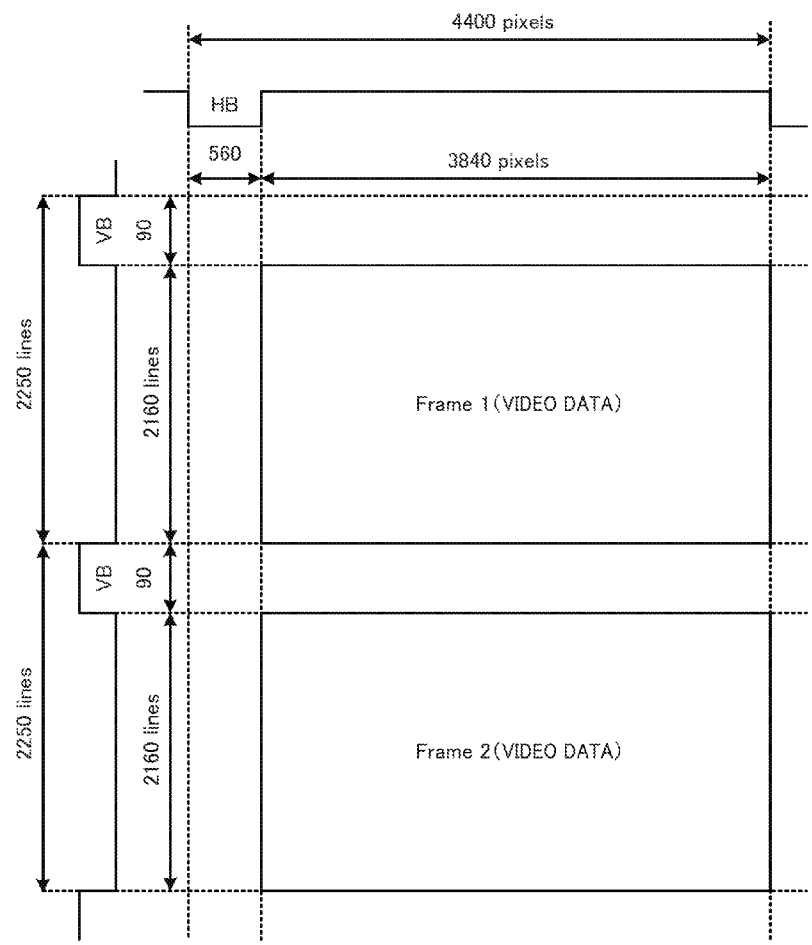
FIG. 3 shows an example transmission format used in the reproduction device and the display device according to the embodiment in a case that auxiliary data is absent.

FIG. 3 shows an example format for transmission of RGB video data of 3,840×2,160 pixels (horizontal/vertical) and 30 Hz without auxiliary data such as HDR information. The video processing unit 104 transmits data including video regions and blanking regions. The video region has a size of 3,840×2,160 pixels (horizontal/vertical) and contains one-frame video data. Although the example formats shown in FIGS. 3-6 will be described with an assumption that the video data is RGB uncompressed video data, the video data may be uncompressed video data of YCbCr 4:4:4, YCbCr 4:2:2, YCrCb 4:2:0, or YCbCr 4:1:1.

The vertical blanking region has a width of 90 lines in the vertical direction and the horizontal blanking region has a width of 560 pixels in the horizontal direction. A vertical sync code for vertical synchronization is buried in a particular region of the vertical blanking region and, likewise, a horizontal sync code for horizontal synchronization is buried in a particular region of the horizontal blanking region.

The format of FIG. 3 is also used for transmission of video data from the HDMI transmission unit 105 to the HDMI receiving unit 201. The HDMI transmission unit 105 transmits auxiliary data such as HDR information according to the existing HDMI standard or a new version of it to be established in the future. According to such an HDMI standard, auxiliary data is buried in, for example, a blanking region, empty bits of video data, any of other kinds of regions. Where HDR information is buried in a blanking region, the HDMI receiving unit 201 detects the auxiliary data using an identifier buried in its header and then extracts the auxiliary data. Information for control of the display device 200, audio data, InfoFrame for notification of the format of video data being transmitted, etc. are buried in the blanking regions.

Figure 4A:
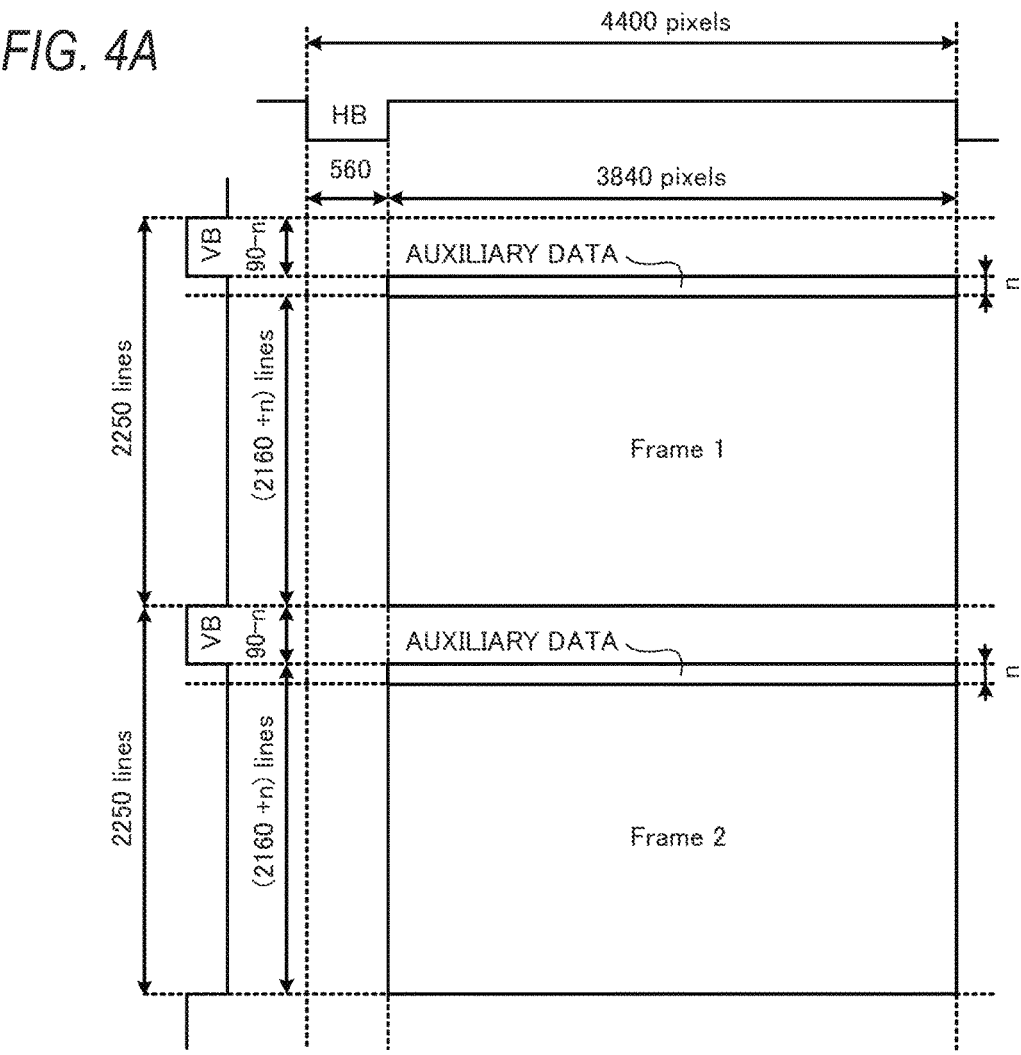
FIGS. 4A and 4B show example transmission formats used in the reproduction device and the display device according to the embodiment in a case that auxiliary data exists.

FIG. 4A shows an example format that is employed in a case that auxiliary data is transmitted. The HDMI transmission unit 105 transmits data including video regions and blanking regions. The non-blanking region has a size of 3,840×(2,160+n) pixels (horizontal/vertical) and contains video body data and auxiliary data. Whereas in the HDMI standard the vertical blanking region has a width of 90 lines in the vertical direction and a width of 4,400 pixels in the horizontal direction, in the format auxiliary data is located in part of those lines, that is, a prescribed number n of lines that are upstream of and immediately adjacent to the video data lines. That is, a region of n lines×3,840 pixels is assigned for auxiliary data.

In other words, whereas in the 4K2K@30 Hz RGB format the number of vertical blanking lines is equal to 90, in the format of FIG. 4A the video processing unit 104 (or HDMI receiving unit 201) communicates with the HDMI transmission unit 105 (or video processing unit 202) prior to a video transmission and thereby shares the information relating to the format of FIG. 4A with the latter. That is, one of the video processing unit 104 (or HDMI receiving unit 201) and the HDMI transmission unit 105 (or video processing unit 202) notifies the other of the fact that the number of vertical blanking lines is equal to 90−n or smaller than usual by n, whereby the size of the vertical blanking region is adjusted.

As mentioned above, an example of auxiliary data is HDR (high dynamic range) information of each video frame. That is, in the format of FIG. 4A, for example, HDR information to be used for setting the video of frame 1 in a high contrast state is located immediately before the video data of frame 1 and HDR information to be used for setting the video of frame 2 in a high contrast state is located immediately before the video data of frame 2. However, when data of this format is processed on the transmission side or the reception side, there may occur an event that processing on auxiliary data located immediately before certain video body data is not completed before the video body data is processed completely. In view of this, auxiliary data may be paired with a video frame that precedes the video frame corresponding to the auxiliary data. That is, auxiliary data of frame (n−α) may be located immediately before video body data of frame n.

Figure 4B:
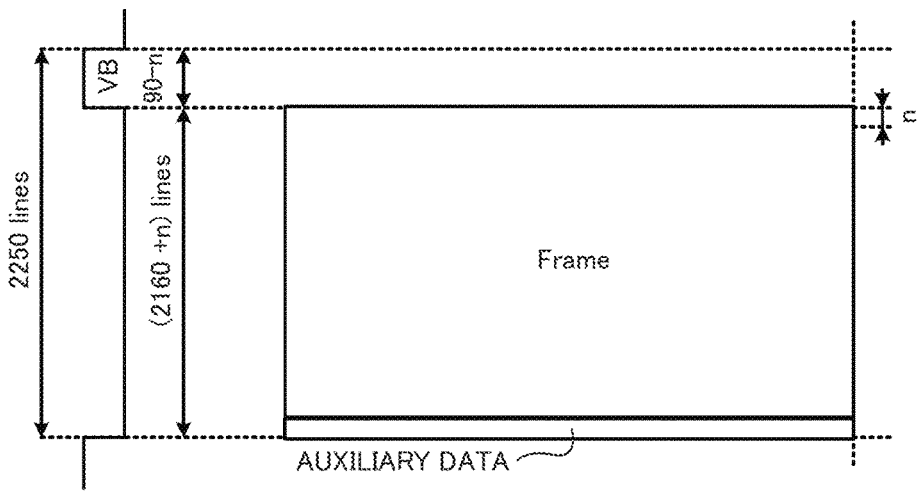

FIG. 4B shows another example format that is employed in the case that auxiliary data is transmitted. In this format, auxiliary data is located in a prescribed number n of lines that are downstream of and immediately adjacent to the video data lines.

Figure 5A:
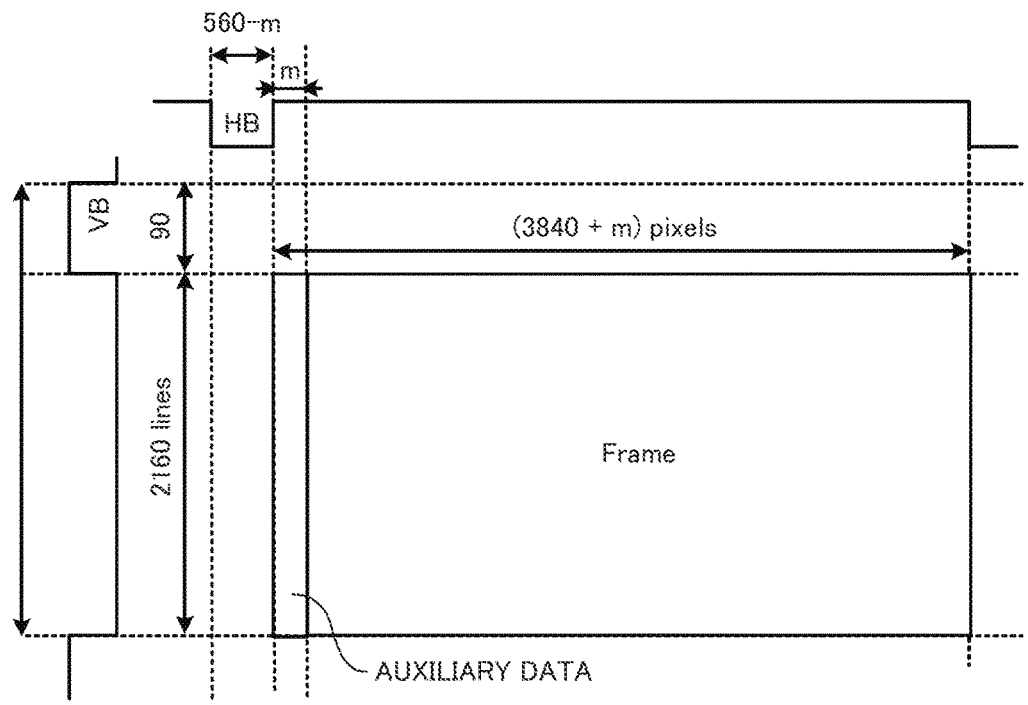
FIGS. 5A and 5B show other example transmission formats used in the reproduction device and the display device according to the embodiment in the case that auxiliary data exists.
Figure 5B:
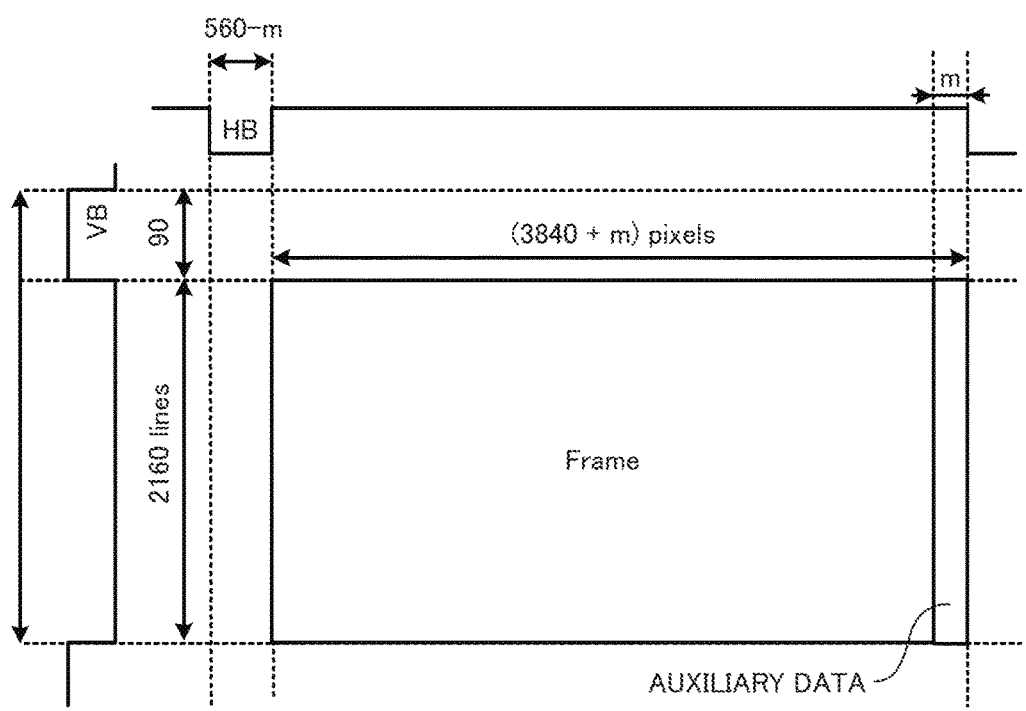

FIGS. 5A and 5B show other example formats that are employed in the case that auxiliary data is transmitted. In the format of FIG. 5A, auxiliary data is located in part of the horizontal blanking region of the HDMI standard, that is, a prescribed number m of pixels that are upstream of (i.e., on the left of) and immediately adjacent to the video data pixels. That is, a region of 2,160 lines×m pixels is assigned for auxiliary data.

In the format of FIG. 5B, auxiliary data is located in a prescribed number m of pixels that are downstream of (i.e., on the right of) and immediately adjacent to the video data pixels.

Figure 6:
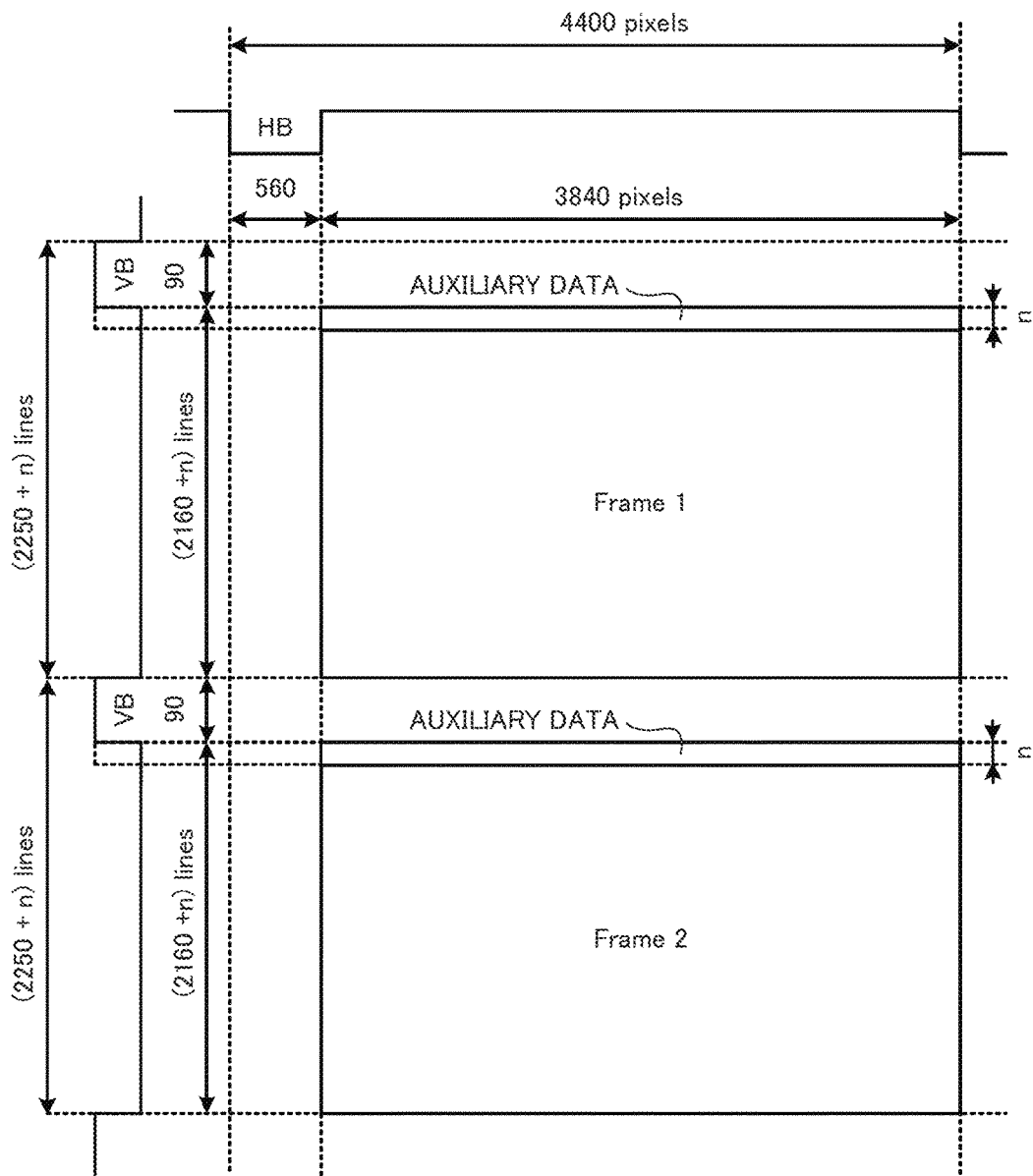
FIG. 6 shows a further example transmission format used in the reproduction device and the display device according to the embodiment in the case that auxiliary data exists.

FIG. 6 shows a further example format that is employed in the case that auxiliary data is transmitted. In this format, the blanking regions are not reduced and, instead, the non-blanking region is expanded by n lines. As a result, the number of lines per frame of the combined region of the blanking regions and the non-blanking region is increased by n. Auxiliary data is located in the non-blanking region.

Although in the format of FIG. 6 auxiliary data is located immediately upstream of the video data, auxiliary data may be located immediately downstream of the video data. The size of the non-blanking region may be increased in the horizontal direction rather than the vertical direction. In this case, as in the formats of FIGS. 5A and 5B, auxiliary data is located in m pixels that are immediately upstream of (i.e., on the left of) or immediately downstream of (i.e., on the right of) the video data pixels. Furthermore, although the format of FIG. 6 has the blanking regions, another format is possible in which each frame is formed by only a non-blanking region, that is, has no blanking regions.

FIGS. 7A and 7B are flowcharts of processes that are executed by the reproduction device 100. More specifically, FIG. 7A is a flowchart of a process that is executed by the video processing unit 104 in transmitting video data to the HDMI transmission unit 105. And FIG. 7B is a flowchart of a process that is executed by the HDMI transmission unit 105 in receiving video data from the video processing unit 104 and transmitting it to the display device 200.

In the process of FIG. 7A, first, at step S701, the video processing unit 104 communicates with the HDMI transmission unit 105 and thereby determines a format to be used for transmitting video data. If the video data includes auxiliary data, the video processing unit 104 employs one of the formats of FIGS. 4A-6 as a transmission format.

If the video data includes auxiliary data (S702: yes), the video processing unit 104 arranges the auxiliary data and the video body data according to the determined format at steps S703 and S704 and transmits resulting data to the HDMI transmission unit 105 at step S705. On the other hand, if the video data includes no auxiliary data (S702: no), the video processing unit 104 arranges the video body data according to the format of FIG. 3 at step S706 and transmits resulting data at step S705.

In the process of FIG. 7B, first, at step S710, the HDMI transmission unit 105 communicates with the video processing unit 104 and thereby determines a format to be used for receiving video data. As mentioned above, if the video data includes auxiliary data, the HDMI transmission unit 105 employs one of the formats of FIGS. 4A-6 as a transmission format. The HDMI transmission unit 105 also determines a format to be used for transmitting the data to the display device 200 over the HDMI cable 300 by reading EDID from the HDMI receiving unit 201 (this step will not be described in detail here).

After the determination of the format, at step S711, the video processing unit 104 starts transmitting video data and the HDMI transmission unit 105 starts receiving it. If video data including auxiliary data is being received (S712: yes), the HDMI transmission unit 105 extracts the auxiliary data and the video body data from the data of the determined format at steps S713 and S714. At step S715, the HDMI transmission unit 105 arranges the auxiliary data and the video body data according to the format of FIG. 3. At step S716, the HDMI transmission unit 105 transmits resulting data to the display device 200 over the HDMI cable 300.

On the other hand, if the video data being received includes no auxiliary data (S712: no), at step S717 the HDMI transmission unit 105 receives data in which video body data is arranged according to the format of FIG. 3 and extracts the video body data from the received data. At step S718, the HDMI transmission unit 105 arranges the extracted video body data again according to the format of FIG. 3. At step S716, the HDMI transmission unit 105 transmits resulting data to the display device 200 over the HDMI cable 300.

FIGS. 8A and 8B are flowcharts of processes that are executed by the display device 200. More specifically, FIG. 8A is a flowchart of a process that is executed by the HDMI receiving unit 201 in receiving video data from the reproduction device 100 and transmitting it to the video processing unit 202. And FIG. 8B is a flowchart of a process that is executed by the video processing unit 202 in receiving video data from the HDMI receiving unit 201 and displaying it on the display unit 203.

In the process of FIG. 8A, at step S801, the HDMI receiving unit 201 receives data that is transmitted from the HDMI transmission unit 105 in the format of FIG. 3 and extracts various data such as auxiliary data (if it exists), video body data, etc. from the received data. At step S802, the HDMI receiving unit 201 communicates with the video processing unit 202 and thereby determines a format to be used for transmitting the video data to the video processing unit 202.

If the video data includes auxiliary data, the HDMI receiving unit 201 employs one of the formats of FIGS. 4A-6 as a transmission format. Steps S801 and S802 may be executed in the opposite order; for example, the HDMI receiving unit 201 may judge, for example, whether or not the data received from the HDMI transmission unit 105 includes auxiliary data by analyzing InfoFrame that is buried in the received data and determine, according to an analysis result, a format to be used for a transmission between itself and the video processing unit 202.

If the video data includes auxiliary data (S803: yes), the HDMI receiving unit 201 arranges extracted auxiliary data and video body data according to the determined format at steps S804 and S805 and transmits resulting data at step S806. On the other hand, if the video data includes no auxiliary data (S803: no), the HDMI receiving unit 201 arranges extracted video body data according to the format of FIG. 3 at step S807 and transmits resulting data at step S806.

In the process of FIG. 8B, first, at step S810, the video processing unit 202 communicates with the HDMI receiving unit 201 and thereby determines a format to be used for receiving video data. As mentioned above, if the video data includes auxiliary data, the video processing unit 202 employs one of the formats of FIGS. 4A-6 as a transmission format. After the determination of the format, at step S811, the HDMI receiving unit 201 starts transmitting video data and the video processing unit 202 starts receiving it.

If video data including auxiliary data is being received (S812: yes), the video processing unit 202 extracts the auxiliary data and the video body data from the data of the determined format at steps S813 and S814. At step S815, the video processing unit 202 generates a video signal using the extracted auxiliary data and video body data and outputs the generated video signal to the display unit 203 to cause it to display the video signal. If the auxiliary data is HDR information of each frame, the video processing unit 202 generates, using the video data body and the HDR information, a video signal that is higher in contrast than one that is generated using only the video body data.

On the other hand, if the video data being received includes no auxiliary data (S812: no), at step S816 the video processing unit 202 receives data in which video body data is arranged according to the format of FIG. 3 and extracts the video body data from the received data. At step S817, the video processing unit 202 generates a video signal using the extracted video body data and outputs the generated video signal to the display unit 203 to cause it to display the video signal.

In the examples of FIGS. 4A and 4B, to transmit video data including auxiliary data, adjustments are made on the transmission side and the reception side so as to perform a transmission in a format in which the size of the vertical blanking region is reduced and the auxiliary data is transmitted in this format. On the other hand, in the example of FIG. 6, auxiliary lines are added to the lines for transmission of video body data and auxiliary data is transmitted using these auxiliary lines. In this case, synchronization for the video body data and the auxiliary data can be made on the reception side by burying a vertical sync code and a horizontal sync code in the auxiliary data to be transmitted using the auxiliary lines.

Although the embodiment has been described above, it is just an example and should not be construed as restricting the scope of the invention. The embodiment may be practiced in various other forms, and part of it may be omitted, replaced by other elements, or changed in various manners without departing from the spirit and scope of the invention. Such modifications will also fall within the scope of the invention.

The invention claimed is:

1. An electronic apparatus comprising:
a video processor configured to:
  transmit first uncompressed video data and high dynamic range (HDR) information in a first transmission format, the HDR information being associated with each video frame of the first uncompressed video data, the first transmission format comprising a first non-blanking region in each video frame; and
a video interface controller configured to:
  receive the first uncompressed video data and the HDR information from the video processor in the first transmission format; and
  transmit second uncompressed video data and the HDR information to an external device in a second transmission format, the second uncompressed video data corresponding to the first uncompressed video data, the second transmission format comprising a second non-blanking region in each video frame, the first non-blanking region being larger than the second non-blanking region.

2. The electronic apparatus of claim 1,
wherein the first uncompressed video data and the HDR information are included in the first non-blanking region.

3. The electronic apparatus of claim 2,
wherein the first transmission format has a first blanking region and the first non-blanking region in each video frame,
wherein the second transmission format has a second blanking region and the second non-blanking region in each video frame, and
wherein the number of lines or the number of horizontal pixels in a combined region of the first blanking region and the first non-blanking region is the same as that of a combined region of the second blanking region and the second non-blanking region.

4. The electronic apparatus of claim 3,
wherein each of the first blanking region and the second blanking region comprises a vertical blanking region, and
wherein the number of lines in the vertical blanking region of the second transmission format is larger than that of the first transmission format.

5. The electronic apparatus of claim 3,
wherein each of the first blanking region and the second blanking region comprises a horizontal blanking region, and
wherein the number of horizontal pixels in the horizontal blanking region of the second transmission format is larger than that of the first transmission format.

6. The electronic apparatus of claim 3,
wherein, in the first transmission format, the HDR information is located in a region that corresponds to the second blanking region of the second transmission format.

7. The electronic apparatus of claim 3,
wherein, in the first transmission format, a part of the HDR information is located in a region that corresponds to the second blanking region of the second transmission format.

8. The electronic apparatus of claim 2,
wherein the first transmission format has the same blanking regions as the second transmission format does, or has no blanking regions.

9. An electronic apparatus comprising:
a video interface controller configured to:
  receive first uncompressed video data and high dynamic range (HDR) information from an external device in a first transmission format, the HDR information being associated with each video frame of the first uncompressed video data, the first uncompressed video data comprising a first non-blanking region in each video frame; and transmit second uncompressed video data and the HDR information in a second transmission, the second uncompressed video data corresponding to the first uncompressed video data, the second transmission format comprising a second non-blanking region in each video frame, the first non-blanking region being larger than the second non-blanking region; and a video processor configured to:

receive the second uncompressed video data and the HDR information from the video interface processor in the second transmission format; and generate a video signal using the second uncompressed video data and the HDR information.

10. The electronic apparatus of claim 9,
wherein the first uncompressed video data and the HDR information are included in the first non-blanking region.

11. The electronic apparatus of claim 10,
wherein the first transmission format has a first blanking region and the first non-blanking region in each video frame,
wherein the second transmission format has a second blanking region and the second non-blanking region in each video frame, and
wherein the number of lines or the number of horizontal pixels in a combined region of the first blanking region and the first non-blanking region is the same as that of a combined region of the second blanking region and the second non-blanking region.

12. The electronic apparatus of claim 11,
wherein each of the first blanking region and the second blanking region comprises a vertical blanking region, and
wherein the number of lines in the vertical blanking region of the second transmission format is larger than that of the first transmission format.

13. The electronic apparatus of claim 11,
wherein each of the first blanking region and the second blanking region comprises a horizontal blanking region, and
wherein the number of horizontal pixels in the horizontal blanking region of the second transmission format is larger than that of the first transmission format.

14. The electronic apparatus of claim 11,
wherein, in the first transmission format, the HDR information is located in a region that corresponds to the second blanking region of the second transmission format.

15. The electronic apparatus of claim 11,
wherein, in the first transmission format, a part of the HDR information is located in a region that corresponds to the second blanking region of the second transmission format.

16. The electronic apparatus of claim 10,
wherein the first transmission format has the same blanking regions as the second transmission format does, or has no blanking regions.

17. A video processing method, comprising:
transmitting, by a video processor, first uncompressed video data and high dynamic range (HDR) information in a first transmission format, the HDR information being associated with each video frame of the first uncompressed video data, the first transmission format comprising a first non-blanking region in each video frame;

receiving, by a video interface controller, the first uncompressed video data and the HDR information in the first transmission format; and transmitting, by the video interface controller, second uncompressed video data and the HDR information to an external device in a second transmission format, the second uncompressed video data corresponding to the first uncompressed video data, the second transmission format comprising a second non-blanking region in each video frame, the first non-blanking region being larger than the second non-blanking region.

18. A video processing method, comprising:
receiving, by a video interface controller, receive first uncompressed video data and high dynamic range (HDR) information from an external device in a first transmission format, the HDR information being associated with each video frame of the first uncompressed video data, the first uncompressed video data comprising a first non-blanking region in each video frame;

transmitting, by the video interface controller, second uncompressed video data and the HDR information in a second transmission, the second uncompressed video data corresponding to the first uncompressed video data, the second transmission format comprising a second non-blanking region in each video frame, the first non-blanking region being larger than the second non-blanking region;

receiving, by a video processor, the second uncompressed video data and the HDR information in the second transmission format; and generating, by the video processor, a video signal using the second uncompressed video data and the HDR information.

* * * * *